J. A. ROBINSON.
Cylinder-Cock.
No. 222,738.  Patented Dec. 16, 1879.
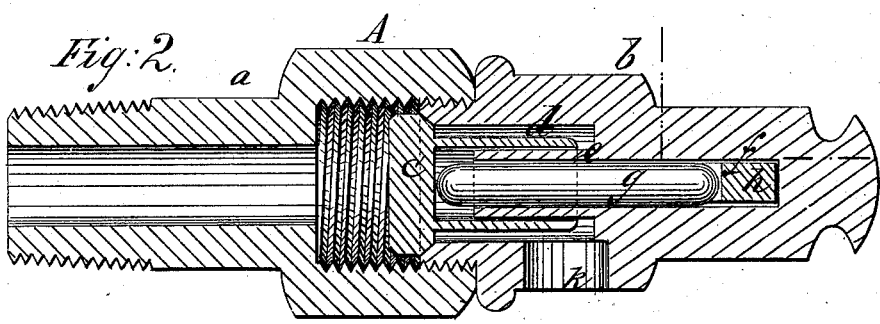
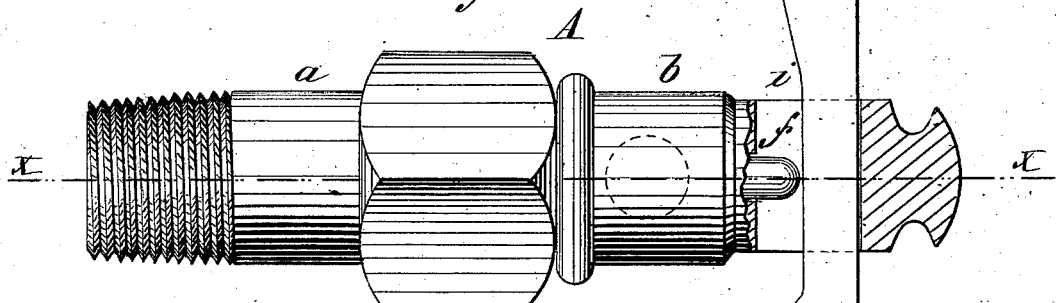
WITNESSES:
Achilles Schehl.
C. Sedgwick
INVENTOR.
J. A. Robinson
BY Munn & Co
ATTORNEYS.

UNITED STATES PATENT OFFICE.

JAMES A. ROBINSON, OF NASHVILLE, TENNESSEE.

IMPROVEMENT IN CYLINDER-COCKS.

Specification forming part of Letters Patent No. 222,738, dated December 16, 1879; application filed October 1, 1879.

*To all whom it may concern:*

Be it known that I, JAMES A. ROBINSON, of Nashville, in the county of Davidson and State of Tennessee, have invented a new and Improved Cylinder-Cock, of which the following is a specification.

The invention consists in combining with a cylinder-cock a thimble-valve sliding on a stem, a loose pin passing through the stem, and a recessed rod fitted to slide in a cross-mortise, as hereinafter described.

Figure 1 is a top view of a cylinder-cock constructed in accordance with my invention, partially in section. Fig. 2 is a longitudinal section on line $x\ x$ of Fig. 1.

Similar letters of reference indicate corresponding parts.

A is my improved cylinder-cock, the body of which is made with a stub portion, $a$, that is to be tapped into the cylinder, and the outer portion, $b$, which is screwed into a screw-threaded recess in the end of $a$, and carries the valve $c$, so that by removing the outer portion, $b$, access is given to the valve and the stud $a$ may remain in the cylinder, thus saving recutting of the joint with the cylinder in case of renewal and repairs.

The inner end of $b$ is formed as a seat for the valve, and the recess in $a$ is made deep enough to give space for the movement of the valve.

The valve $c$ is formed with a thimble portion, $d$, that sets over a tubular stem, $e$, which is formed on $b$, and projects into the central opening of the portion $b$, whereby the valve $c$ is sustained by and moves on the stem $e$.

The aperture of the stem $e$ connects with a cross-mortise, $f$, that is formed in the outer end of the cock, and within the stem $e$ is a pin, $g$, that bears upon valve $c$ with its inner end, and at its outer end enters the cross-mortise $f$.

The device for setting the valve open consists of a bar or rod, $h$, fitting snugly in the cross-mortise $f$, so as to slide therein, and formed at its end with a recess, $i$, wedge-shaped or inclined at its ends. The rod $h$ is to be fitted at its outer end with a pin and nut for connection to the usual devices for operating a cylinder-cock, whereby rod $h$ may be moved endwise in mortise $f$, and recess $i$ positioned for allowing the valve $c$ to close entirely by the pressure or for retaining the valve more or less open. This construction saves the expensive knuckles and pins heretofore used for connecting the operating-rod of cylinder-cocks.

In the under side of the portion $a$ is the outlet-opening $k$, which may be drilled straight or inclined, as desired. This opening $k$ is to be of ample size, and the escape-spaces at the inside of the cock being also proportionately large, there will be no back-pressure to force water out around the stem.

By the above-described construction the valve is free to move so as to close by pressure from the cylinder; and it may also revolve on the stem $e$, so that the wear will be equal on the seat, and the valve will always close tightly. The valve $c$ will also open instantly by suction in the cylinder when steam is cut off, thereby allowing air to enter for relieving the cylinder and packing from strain.

In opening the valve against pressure the wedge ends of the recess $i$ in rod $h$ act against end of pin $g$. I thereby obtain a powerful action, and, to assist the movement, the end of pin $g$ will be rounded, as shown.

Having thus described my invention, what I claim as new, and desire to secure by Letters Patent, is—

In cylinder-cocks, in combination with the thimble-valve $c$, fitted to slide on stem $e$, the loose pin $g$, passing through stem $e$, and the recessed rod $h$, fitted to slide in the cross-mortise $f$, constructed and arranged substantially as and for the purposes specified.

JAMES ALOYSIUS ROBINSON.

Witnesses:
W. T. FRANKLIN,
CHARLES GRANT.